United States Patent [19]

Mashita et al.

[11] Patent Number: 4,780,505

[45] Date of Patent: Oct. 25, 1988

[54] THERMOPLASTIC RESIN COMPOSITION

[75] Inventors: Kentaro Mashita; Takeshi Fujii; Tadayuki Oomae, all of Chiba, Japan

[73] Assignee: Sumitomo Chemical Co., Ltd., Osaka, Japan

[21] Appl. No.: 768,155

[22] Filed: Aug. 22, 1985

[30] Foreign Application Priority Data

Sep. 5, 1984 [JP] Japan ................................ 59-186221

[51] Int. Cl.⁴ ............................................ C08L 79/00
[52] U.S. Cl. ...................................... 525/66; 525/179; 525/182; 525/183
[58] Field of Search .................. 525/66, 183, 184, 179

[56] References Cited

U.S. PATENT DOCUMENTS

| | | | |
|---|---|---|---|
| 3,454,512 | 7/1969 | Ahmed . | |
| 3,696,069 | 10/1972 | Schrage . | |
| 4,172,859 | 10/1979 | Epstein | 525/109 |
| 4,174,358 | 11/1979 | Epstein | 525/184 |
| 4,338,413 | 7/1982 | Coran et al. | 525/183 |
| 4,548,985 | 10/1985 | Yazaki | 525/65 |
| 4,550,130 | 10/1985 | Kishida | 523/436 |

FOREIGN PATENT DOCUMENTS

| | | | |
|---|---|---|---|
| 2107358 | 5/1972 | France . | |
| 45-30945 | 10/1970 | Japan . | |
| 45-30944 | 10/1970 | Japan . | |
| 0141360 | 12/1978 | Japan | 525/66 |
| 55-44108 | 11/1980 | Japan . | |
| 56-074168 | 6/1981 | Japan | 525/176 |
| 57-105448 | 6/1982 | Japan | 525/64 |
| 58-47419 | of 1983 | Japan . | |
| 52670 | 2/1967 | Luxembourg . | |
| 1345747 | 2/1974 | United Kingdom . | |
| 1352088 | 5/1974 | United Kingdom . | |
| 2099435A | 12/1982 | United Kingdom | 525/66 |

OTHER PUBLICATIONS

U.S. Pat. No. 4,146,590, U.S. Patent Office Gazette, p. 1445 (Mar. 27, 1979).

*Primary Examiner*—John C. Bleutge
*Assistant Examiner*—A. Carrillo
*Attorney, Agent, or Firm*—Cushman, Darby & Cushman

[57] ABSTRACT

A novel thermoplastic resin composition is provided. It has excellent balance in the physical properties and is usable as shaped articles, sheets and films having excellent appearance in uniformity and smoothness. The thermoplastic resin composition is a blend of a resin composition (D) defined below and a copolymer (C) containing epoxy group, said (D) being composed of modified polypropylene by unsaturated carboxylic acid or anhydride thereof with or without unmodified polypropylene, and polyamide resin. The copolymer (C) is composed of an unsaturated epoxy compound and ethylene, with or without an ethylenically unsaturated compound other than ethylene.

13 Claims, No Drawings

THERMOPLASTIC RESIN COMPOSITION

This invention relates to a novel thermoplastic resin composition usable as shaped articles, sheets and films by injection molding, extrusion molding and the like. More particularly, it relates to a novel thermoplastic resin composition excelling in balance among physical properties and appearance, which is composed of polypropylene resin, polyamide resin and copolymer containing epoxy group.

Polypropylene possesses excellent properties in processability, toughness, water resistance, gasoline resistance and chemical resistance. It has small specific gravity and is inexpensive. It has been hence conventionally used widely for various shaped articles, films and sheets.

However, polypropylene has difficulties to be improved in heat resistance, rigidity, impact resistance, paintability, adhesion, and printability. These problems arrest the new development in commercial applications. In order to improve paintability, adhesion and printability, a process had been proposed wherein at least a part of polypropylene is modified by having such unsaturated carboxylic acid or anhydride thereof as maleic anhydride grafted thereon (Japanese Examined Patent Publication No. 47413/1983; Japanese Unexamined Patent Publication No. 49736/1983). However, the modification is not satisfactory yet in order to have impact resistance, heat resistance, rigidity or other properties substantially improved.

On the other hand, polyamide resins are widely used for automotive parts, and electric and electronic parts as an engineering resin having outstanding features in heat resistance, rigidity, strength and oil resistance. Further improvements are still desired, however, in processability, impact resistance, water resistance and chemical resistance. Besides, it has essential difficulties, i.e., greater specific gravity than polyolefin, and is expensive.

From the view point above, possibility of novel wider applications will be expected when a thermoplastic resin appears which possesses both features of polypropylene resin and polyamide resin by blending polypropylene resin selected from modified polypropylene with or without polypropylene, and polyamide resin. However, it is known that polypropylene resin is hardly compatible with polyamide resin. Blending simply causes too much damages to a mixture product: (1) since Barus effect of molten polymer is extreme, stable intake of extruded strand is next to impossible, and processability is greatly poor; (2) the injection molded articles are extremely ununiform and are poor in appearance because of flow marks, and cannot be applicable practically for use in automotive parts or electronic and electric parts; and (3) the mechanical properties, in particular, impact resistance and tensile elongation of moldings are lower than those expected from the properties of the individual resins.

It is a primary object of this invention to provide a novel thermoplastic resin composition possessing an extremely satisfactory balance in properties including processability, rigidity, heat resistance, impact resistance, scratch resistance, paintability, oil resistance, chemical resistance, and water resistance, and excelling in appearance in uniformity and smoothness.

According to the present invention, a thermoplastic resin composition is provided, which contains 2 to 30 parts by weight of a copolymer containing epoxy group (C) and 100 parts by weight of a resin composition composed of 10 to 90 wt. % of polypropylene-resin (A) selected from modified polypropylene with or without unmodified polypropylene and 90 to 10 wt. % of polyamide resin (B).

The polypropylene-resin (A) is a resin selected from modified polypropylene with or without polypropylene. Here, polypropylene refers to crystalline one. It includes, besides homopolymer of propylene, block or random copolymer of propylene copolymerized with, for example, ethylene, butene-1 or other $\alpha$-olefin. The modified polypropylene is a product of graft modification of such homopolymer or copolymer of propylene with unsaturated carboxylic acid(s) or an anhydride(s) in the range of 0.05 to 20 wt. %, preferably 0.1 to 10 wt. %. The melt index of this polypropylene-resin (A) may be in the range of 0.1 to 100, preferably 0.5 to 40.

The homopolymer and block or random copolymers, of propylene may be obtained by the reaction in the presence of a combined catalyst system of, for example, titanium trichloride and an alkylaluminum compound, which is familiar as the Ziegler-Natta type catalyst.

The modified polypropylene is graft-modified with an unsaturated carboxylic acid or its anhydride. Examples of monomers to be grafted include acrylic acid, methacrylic acid, maleic acid, itaconic acid, maleic anyhydride, itaconic anhydride. Particularly, maleic anhydride is preferable.

Grafting the monomers onto polypropylene may be effected by various known methods. For example, polypropylene, a grafting monomer and a radical initiator are mixed, and kneaded in the molten state in an extruder. Alternatively, polypropylene is dissolved in an organic solvent such as xylene, and a radical initiator is added thereto under nitrogen atmosphere, then, the mixture is allowed to react under heat, cooled after the reaction, washed, filtered and dried. Furthermore, polypropylene may be irradiated with ultraviolet rays or radial rays, or brought into contact with oxygen or ozone, in the presence of the grafting monomers.

The polyamide resin (B) is polyamide obtained by polycondensation of lactam having three or more membered ring, polymerizable $\omega$-amino acid, or a dibasic acid with a diamine. Practical examples are polymers of $\epsilon$-caprolactam, aminocaproic acid, enantholactam, 7-aminoheptanoic acid, 11-aminoundecanoic acid and the like; polymers or copolymers obtained by polycondensation of diamines such as hexamethylenediamine, nonamethylenediamine, undecamethylenediamine, dodecamethylenediamine or methaxylenediamine, with diacarboxylic acids such as terephthalic acid, isophthalic acid, adipic acid, sebacic acid, dodecandioic acid and glutaric acid. More particularly, examples are polyamide 6, polyamide 6,6, polyamide 6,10, polyamide 11, polyamide 12, polyamide 6,12 or other aliphatic polyamides; and polyhexamethylenediamine terephthalamide, polyhexamethylenediamine isophthalamide, polyamides containing xylyl group or other aromatic polyamides. They may be in the form of mixtures of copolymers of two or more compounds among them.

The copolymer (C) containing epoxy group is a copolymer of an unsaturated epoxy compound and an ethylenically unsaturated compound. The composition ratio of the copolymer (C) containing epoxy resin is not particularly limited, but the unsaturated epoxy compound may be contained by 0.1 to 50 wt. %, preferably 1 to 30 wt. %.

The unsaturated epoxy compound possesses an unsaturated group which is copolymerizable with an ethylenically unsaturated compound, and an epoxy group. For example, unsaturated glycidyl esters or unsaturated glycidyl ethers having the formula (1) or (2) below may be used.

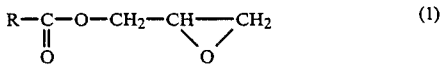  (1)

wherein R is a hydrocarbon group with 2 to 18 carbon atoms having an ethylenically unsaturated bond;

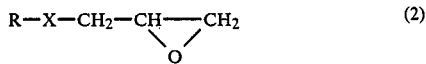  (2)

where R is the same as defined above and X is —CH$_2$—O— or

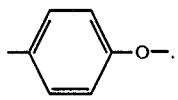

Practical examples are glycidyl acrylate, glycidyl methacrylate, glycidyl itaconate, allyl glycidyl ether, 2-methylallyl glycidyl ether, p-styryl glycidyl ether and the like.

The ethylenically unsaturated compound may be olefins, vinyl ester of saturated carboxylic acids having 2 to 6 carbon atoms, esters of saturated alcohol component having 1 to 8 carbon atoms with acrylic or methacrylic acid, maleates, methacylates, fumarates, halogenated vinyl compounds, styrenes, nitriles, vinyl ethers and acrylamides. Practical examples are ethylene, propylene, butene-1, vinyl acetate, methyl acrylate, ethyl acrylate, methyl methacrylate, diethyl maleate, diethylfumarate, vinyl chloride, vinylidene chloride, styrene, acrylonitrile, isobutyl vinyl ether, acrylamide and the like. Above all, ethylene is particularly preferable.

The copolymer (C) containing epoxy group may be prepared in various methods. One of the methods is a random copolymerization method in which an unsaturated epoxy compound is introduced into the trunk chain of the copolymer. Alternatively, a graft copolymerization method may be effected in which an unsaturated epoxy compound is introduced as the side chain of the copolymer. Specifically, for instance, an unsaturated epoxy compound and ethylene are copolymerized in the presence of a radical initiator, at 500 to 4,000 atmospheric pressures and 100° to 300° C. with or without a proper solvent or a chain-transfer agent. Alternatively, an unsaturated epoxy compound and a radical initiator are mixed with polypropylene, and the mixture is molten in an extruder for graft copolymerization; or an unsaturated epoxy compound and an ethylenically unsaturated compound are copolymerized in the presence of a radical initiator in an inert solvent such as an organic solvent or water.

In the thermoplastic resin composition according to this invention, the polypropylene-resin (A) as the first component is contained by 10 to 90 wt. %, preferably 20 to 80 wt. % on the basis of (A) plus (B). If the polypropylene-resin (A) is less than 10 wt. %, processability, toughness, water resistance and chemical resistance are not satisfactory, while more than 90 wt. %, favorable properties are not obtained in the heat resistance, strength and rigidity. When modified polypropylene is used with unmodified polypropylene, it is necessary that the modified polypropylene should be 5 wt. % or more in the mixture. If the modified one is less than 5 wt. %, toughness or impact resistance obtained are not satisfactory and no substantial improvement is expected in paintability, adhesion and printability, since compatible dispersion in the present resin composition is not sufficient.

The polyamide resin (B) as the second component is 90 to 10 wt. %, preferably 80 to 20 wt. %, more preferably 60 to 20 wt. % on the basis of (A) and (B). If it is less than 10 wt. %, the heat resistance, rigidity and strength obtained are not sufficient, while if it exceeds 90 wt. %, processability, toughness, water resistance and chemical resistance obtained are not satisfactory.

The copolymer (C) containing epoxy group is blended by 2 to 30 parts by weight, preferably 3 to 20 parts by weight, to the sum 100 parts by weight of the polypropylene-resin (A) and the polyamide resin (B). If the copolymer (C) is less than 2 parts by weight, toughness and impact resistance are not sufficient, and flow marks appear on the shaped articles to deteriorate the appearance and the extrusion stability is not good, since compatible dispersion of the resin composition is not satisfactory. If the copolymer (C) exceeds 30 parts by weight, favorable results are not obtained, since layer peeling occurs on the molded articles, and rigidity, toughness and impact resistance are greatly damaged.

The present resin composition may be used as it is. Alternatively, it may be in composite forms incorporating therein at least one of glass fibers, carbon fibers, polyamide fibers, metal whiskers or other reinforcing fiber materials, and silica, alumina, calcium carbonate, talc, mica, carbon black, TiO$_2$, ZnO, Sb$_2$O$_3$ or other inorganic fillers and flame retarding aids, other lubricants, nucleating agents, plasticizers, dystuffs, pigments, antistatic agents, antioxidants, weatherable aids or the like.

The resin composition of this invention is prepared by any of publicly known methods. Most preferred from a commercial point of view is to knead them in molten state, although it is effective to blend the components in a solution and evaporate the solvent, or to precipitate in a nonsolvent. A Banbury mixer, extruders, rolls, kneaders and other ordinary machines may be used for the kneading in molten state. In the kneading, it is preferable to uniformly premix the resin components in powder or pellet form by means of tumblers, Henschel mixers or the like. It is possible, if necessary, to feed them quantitatively in separate ways into a kneading machine without the premixing.

The kneaded resin composition may be shaped by any of injection molding, extrusion molding or other method. Alternatively, directly kneading in the melting and processing operation by blending in dry state at the time of injection molding or extrusion molding may be effected without the pre-kneading. In this invention, the kneading order is not particularly specified. That is, for example, the components (A), (B) and (C) may be kneaded altogether, or first (A) and (B) may be prekneaded before (C) is added. Any other kneading orders may possible, except first kneading (A) and (C) before adding (B), since gel may sometimes be formed and a favorable resin composition is not obtained.

Hereinafter, this invention will be described in conjunction with the working examples, wherein they are merely illustrative ones, and this invention is not limited to them. In these examples, the tensile test is conducted according to JIS K 7113, the bending test JIS K 7203 (thickness 3.2 mm) and the Izod impact strength (thickness 3.2 mm) JIS K 7110.

The modified polypropylene and copolymers containing epoxy group, used in the Examples and Reference Examples were prepared in the following prescriptions. As the polypropylene and the polyamide resins, commercial products were used.

(1) Modified Polypropylene

It was prepared by referring to the method disclosed in the Japanese Examined Patent Publication No. 9925/1981.

Polypropylene, maleic anhydride and tertiary butylperoxy laurate were premixed. As an extruder with a screw diameter of 30 mm and L/D ratio of 28 was set at a barrel temperature of 230° C., and the above mixture was fed in from a hopper, and the machine was operated at screw rotating speed of 60 rpm to promote the reaction. The modified polypropylene-molten strand discharged from the die of the extruder was cooled in water and then pelletized.

(2) Polypropylenes

Propylene homopolymer: Sumitomo Noblen W501 manufactured by Sumitomo Chemical Co., Ltd.
Propylene-ethylene.propylene block copolymer: Sumitomo Noblen AW564 manufactured by Sumitomo Chemical Co., Ltd.

(3) Polyamide Resins

Polyamide 6,6: Ube Nylon 2020B manufactured by Ube Industries, Ltd.
Polyamide 6: Ube Nylon 1013NB manufactured by Ube Industries, Ltd.

(4) Copolymers Containing Epoxy Group

Glycidyl methacrylate-ethylene copolymer and glycidyl methacrylate-ethylene-vinyl acetate copolymer The copolymers were prepared by referring to the methods disclosed in the Japanese Unexamined Patent Publication No. 23490/1972 and Japanese Unexamined Patent Publication No. 11388/1973.

To a temperature-controllable 40-liter stainless steel reaction vessel equipped with proper feeding inlets, takeout outlet and an agitating device, were continuously supplied and agitated glycidyl methacrylate, ethylene, vinyl acetate, a radical initiator and a chain-transfer agent, and copolymerization is effected at 1,400 to 1,600 atmospheric pressures and 180° to 200° C.
Glycidyl methacrylate-grafted ethylene-vinyl acetate copolymer It was manufactured by referring to the Japanese Examined Patent Publication No. 12449/1980.

Glycidyl methacrylate having dicumyl peroxide dissolved preliminarily was mixed with ethylene-vinyl acetate copolymer pellets, and the mixture was allowed to diffuse and penetrate at room temperature. The pellets impregnating glycidyl methacrylate were extruded at the terminal temperature of 170° C. by using an extruder with 65 mmφ vent, and graft-copolymerized copolymer pellets containing epoxy group were obtained.

EXAMPLE 1

Preparation Of Modified Polypropylene

Homopolymer (Sumitomo Noblen FS1012 manufactured by Sumitomo Chemical Co., Ltd.) as the base resin was modified with maleic anhydride to obtain modified polypropylene having maleic anhydride grafted by 0.11 wt. %.

This modified polypropylene, polyamide 6,6, and glycidyl methacrylate-ethylene-vinyl acetate copolymer (ratio by weight: 10-85-5) were blended at the rate mentioned in Table 1-1. The blend was preliminarily admixed for 20 minutes in a tumbler, then, charged into an extruder with 65 mmφ vent (manufactured by Ikegai Iron Works, Ltd.). The blend was molten and kneaded at 280° C., thus, a pelletized resin composition was obtained. After having been dried for 5 hours at 140° C., this composition was molded in a 10-ounce injection molding machine (model IS150E-V manufactured by Toshiba Corporation) at molding temperature of 280° C. and mold temperature of 80° C., and test pieces for measurement of the properties were obtained.

The test results of the obtained test pieces were as shown in Table 1-2.

The resin composition of this invention was good in stability of strand pulling in kneading by an extruder, and very excellent in the appearance of injection molded piece. Besides, the balance of properties was excellent. In particular, the tensile elongation and Izod impact strength were extremely high. This substantiates the compatible dispersion of this resin composition is extremely excellent.

EXAMPLE 2

The modified polypropylene manufactured in Example 1, propylene homopolymer polyamide 6,6 and glycidyl methacrylate-ethylene copolymer (ratio by weight: 6-94) were blended at the rate mentioned in Table 1-1. They were mixed, kneaded and injection-molded in the same manner as in Example 1 to prepare test pieces for measurement of the properties. The test results are shown in Table 1-2.

The resin composition of this invention was good in stability of strand pulling in kneading by an extruder, and very excellent in the appearance of injection molded piece. Besides, the balance of properties was excellent. In particular, the tensile elongation and Izod impact strength were extremely high. This exhibits that the compatible dispersion of this resin composition is extremely excellent.

REFERENCE EXAMPLE 1

The modified polypropylene manufactured in Example 1 and polyamide 6,6 were blended at the rate mentioned in Table 1-1. They were mixed, kneaded, and injection molded in the same manner as in Example 1 to prepare test pieces for measurement of the properties. The test results are shown in Table 1-2.

When copolymer containing epoxy group was not blended, the stability in strand pulling in kneading by an extruder was inferior to the present composition, and flow marks were observed in the injection molded pieces, and the appearance was extremely poor. Besides, since the compatible dispersion was insufficient, the tensile elongation and Izod impact strength were particularly inferior to those of the present composition.

REFERENCE EXAMPLE 2

The modified polypropylene manufactured in Example 1, propylene homopolymer, polyamide 6,6 and glycidyl methacrylate-ethylene copolymer (ratio by weight: 6-94) were blended at the rate mentioned in Table 1-1. They were mixed, kneaded and injection molded in the same manner as in Example 1 to obtain test pieces for measurement of the properties. The test results are shown in Table 1-2.

When an amount of the glycidyl methacrylate-ethylene copolymer is 1 part by weight to 99 parts by weight of the resin composition comprising the modified polypropylene, propylene homopolymer and polyamide above, the stability in strand pulling in kneading by an extruder and appearance of injection molded pieces were slightly improved, but were not sufficient, because the compatible dispersion was not sufficient yet. The properties were also inferior to those of the present composition.

REFERENCE EXAMPLE 3

Propylene homopolymer, polyamide 6,6 and glycidyl methacrylate-ethylene-vinyl acetate copolymer (ratio by weight: 10-85-5) were blended at the rate in Table 1-1. They were mixed, kneaded and injection molded in the same manner as in Example 1 to prepare test pieces for measurement of properties. The test results are shown in Table 1-2.

When copolymer containing epoxy group was blended, the stability in strand pulling in kneading by an extruder and appearance of injection molded pieces were improved. However, since modified polypropylene was not blended, the compatible dispersion was not sufficient, and the tensile elongation and Izod impact strength were particularly inferior to the present composition.

TABLE 1-1

(Unit: wt. %)

| Resin composition | Examples | | Reference Examples | | |
|---|---|---|---|---|---|
| Sample No. | 1 | 2 | 1 | 2 | 3 |
| Modified polypropylene (4) Homobase | 38 | 24 | 40 | 25 | — |
| Polypropylene (3) Homopolymer | — | 14 | — | 15 | 38 |
| Polyamide resin Polyamide 6,6 | 57 | 57 | 60 | 59 | 57 |
| Copolymer containing epoxy group | | | | | |
| GMA-E-VA (1) | 5 | — | — | — | 5 |
| GMA-E (2) | — | 5 | — | 1 | — |

Notes
(1) Glycidyl methacrylate-ethylene-vinyl acetate copolymer (ratio by weight: 10-85-5)
(2) Glycidyl methacrylate-ethylene copolymer (ratio by weight: 6-94)
(3) Polypropylene Melt Index (230° C., 2.16 Kg) 8.0
(4) Modified polypropylene Melt Index (230° C., 2.16 Kg) 30

TABLE 1-2

| Test result | Example | | Reference Example | | |
|---|---|---|---|---|---|
| Sample No. | 1 | 2 | 1 | 2 | 3 |
| Extrusion stability | Excellent | Excellent | Good | Good | Excellent |
| Tensile strength (kg/cm$^2$) | 430 | 440 | 530 | 530 | 250 |
| Tensile elongation (%) | 65 | 68 | 40 | 40 | 5 |
| Izod impact strength (kg·cm/cm) | | | | | |
| Notched | 9.2 | 8.9 | 6.3 | 5.5 | 4.1 |
| Unnotched | Not broken | Not broken | 58 | 100 | 26 |
| Bending strength (kg/cm$^2$) | 680 | 690 | 780 | 840 | 540 |
| Bending modulus of elasticity (kg/cm$^2$) | 24,800 | 25,000 | 28,600 | 26,600 | 19,000 |
| Appearance | Excellent | Excellent | Poor | Poor | Excellent |

EXAMPLES 3-4, REFERENCE EXAMPLE 4

Preparation Of Modified Polypropylene

Propylene-ethylene.propylene block copolymer (Sumitomo Noblen AH561 manufactured by Sumitomo Chemical Co., Ltd.) as the base resin was modified with maleic anhydride to obtain modified polypropylene having maleic acid grafted by 0.22 wt. %.

The above modified polypropylene, a propylene-ethylene.propylene block copolymer, polyamide 6,6 and a glycidyl methacrylate-ethylene copolymer (ratio by weight: 12-88) were blended at the rate in Table 2-1. They were mixed, kneaded and injection molded in the same manner as in Example 1 to obtain test pieces for measurement of the properties. The results are shown in Table 2-2.

EXAMPLE 5

The modified polypropylene manufactured in Example 1, propylene homopolymer, polyamide 6 and glycidyl methacrylate-ethylene-vinyl acetate copolymer (ratio by weight: 10-85-5) were blended at the rate mentioned in Table 2-1, and premixed for 20 minutes in a tumbler. They were melted and kneaded at 240° C. in an extruder with 65 mm$\phi$ vent (manufactured by Ikegai Iron Work, Ltd.) to be pelletized, thus, a resin composition was obtained. After having been dried at 140° C. for 5 hours, this composition was molded into test pieces for measurement of the properties at molding temperature of 280° C. and mold temperature of 80° C. by a 10-ounce injection molding machine (model IS150-E-V manufactured by Toshiba Corporation). The test results are as shown in Table 2-2.

The resin composition of this invention was good in stability of strand pulling in kneading by an extruder, and very excellent in the appearance of injection molded piece. Besides, the balance of properties was excellent. In particular, the tensile elongation and Izod impact strength were extremely high. This substantiates that the compatible dispersion of this resin composition is extremely excellent.

REFERENCE EXAMPLE 5

Propylene homopolymer, polyamide 6 and a glycidyl methacrylate-ethylene-vinyl acetate copolymer (ratio by weight: 10-85-5) were blended at the rate in Table 2-1. They were mixed, kneaded and injection molded in the same manner as in Example 5 to prepare test pieces for measurement of the properties. The test results are shown in Table 2-2.

When the copolymer containing epoxy group was blended, the stability in strand pulling in kneading by extruder and the appearance of injection molded piece are improved. But, since modified polypropylene is not blended, the compatible dispersion is not sufficient yet, and the tensile elongation and Izod impact strength are particularly inferior to those of this composition.

EXAMPLE 6

Preparation Of Modified Polypropylene

Propylene-ethylene random copolymer (Sumitomo Noblen FA6411 manufactured by Sumitomot Chemical Co., Ltd.) as the base resin was modified with maleic anhydride to obtain modified polypropylene having maleic anhydride grafted by 0.14 wt. %.

The above modified polypropylene, propylene homopolymer, polyamide 6,6 and glycidyl methacrylate-grafted ethylene-vinyl acetate (containing GMA by 4 wt. %) were blended at the rate in Table 2-1. They were mixed, kneaded and injection molded in the same manner as in Example 1 to obtain test pieces for measurement of the properties. The results are shown in Table 2-2.

TABLE 2-1

(Unit: wt. %)

| Resin composition | Examples Sample No. | | | | Reference Examples | |
|---|---|---|---|---|---|---|
| | 3 | 4 | 5 | 6 | 4 | 5 |
| Modified polypropylene | | | | | | |
| Block base (6) | 25 | 24 | — | — | 26 | — |
| Homobase (7) | — | — | 25 | — | — | — |
| Random base (8) | — | — | — | 7 | — | — |
| Polypropylene | | | | | | |
| Block copolymer (4) | 41 | 39 | — | — | 44 | — |
| Homopolymer (5) | — | — | 41 | 59 | — | 66 |
| Polyamide resin | | | | | | |
| Polyamide 6,6 | 29 | 27 | — | 29 | 30 | — |
| Polyamide 6 | — | — | 29 | — | — | 29 |
| Copolymer containing epoxy group | | | | | | |
| GMA-E (1) | 5 | 10 | — | — | — | — |
| GMA-E-VA (2) | — | — | 5 | — | — | 5 |
| GMA-g-EVA (3) | — | — | — | 5 | — | — |

Notes
(1) Glycidyl methacrylate-ethylene copolymer (ratio by weight: 12-88)
(2) Glycidyl methacrylate-ethylene-vinyl acetate copolymer (ratio by weight: 10-85-5)
(3) Glycidyl methacrylate-grafted ethylene-vinyl acetate copolymer (containing GMA by 4 wt. %)
(4) Block copolymer Melt Index (230° C., 2.16 kg) 2.0
(5) Homopolymer Melt Index (230° C., 2.16 kg) 8.0
(6) Modified polypropylene Block base Melt Index (230° C., 2.16 kg) 30
(7) Modified polypropylene Homobase Melt Index (230° C., 2.16 kg) 30
(8) Modified polypropylene Random base Melt Index (230° C., 2.16 kg) 10

TABLE 2-2

| Test result | Examples Sample No. | | | | Reference Examples | |
|---|---|---|---|---|---|---|
| | 3 | 4 | 5 | 6 | 4 | 5 |
| Extrusion stability | Excellent | Excellent | Excellent | Excellent | Good | Excellent |
| Tensile strength (kg/cm$^2$) | 260 | 240 | 340 | 420 | 270 | 280 |
| Tensile elongation (%) | 38 | 44 | 57 | 62 | 14 | 8 |
| Izod impact strength (kg · cm/cm) | | | | | | |
| Notched | 9.1 | 9.5 | 6.7 | 9.1 | 9.8 | 3.7 |
| Unnotched | Not broken | Not broken | Not broken | Not broken | 93 | 33 |
| Bending strength (kg/cm$^2$) | 390 | 380 | 560 | 650 | 460 | 580 |
| Bending modulus of elasticity (kg/cm$^2$) | 13,400 | 11,800 | 18,300 | 23,600 | 14,200 | 17,300 |
| Appearance | Excellent | Excellent | Excellent | Excellent | Poor | Excellent |

EXAMPLES 7 TO 9

The modified polypropylene manufactured in Example 1 (16.5 wt. %), propylene homopolymer (27.6 wt. %), polyamide 6,6 (18.9 wt. %), glycidyl methacrylate-ethylene-vinyl acetate copolymer (ratio by weight: 10-85-5) (7 wt. %) and various reinforcing agents (30 wt. %) shown in Table 3 where blended, mixed, kneaded and injection molded in the same procedure as in Example 1 to prepare test pieces. The test results are shown in Table 3.

TABLE 3

| Test result | Examples Sample No. | | |
|---|---|---|---|
| | 7 | 8 | 9 |
| Reinforcing agent | Glass fiber | Talc | Mica |
| Extrusion stability | Excellent | Excellent | Excellent |
| Tensile strength (kg/cm$^2$) | 860 | 430 | 440 |
| Tensile elongation (%) | 8 | 12 | 10 |
| Izod impact strength (kg · cm/cm) | | | |
| Notched | 12 | 6.6 | 5.2 |
| Unnotched | 68 | 67 | 58 |
| Bending strength (kg/cm$^2$) | 1,150 | 710 | 730 |
| Bending modulus of elasticity (kg/cm$^2$) | 59,400 | 34,400 | 43,700 |
| Appearance | — | Excellent | Excellent |

Glass fiber: RES06-TP37 made by Japan Glass Fiber Co. (Fiber diameter 13 microns, length 3 mm)
Talc: JR-2 made by Hayashi Chemical Co. (mean particle size 8 microns)
Mica: 325HK made by Kuraray Ltd. (Mean particle size 40 microns)

The thermoplastic resin composition of this invention is excellent not only in processability, but also in various properties of molded article which are by far better than those of the individual components of the composition.

Moreover, the thermoplastic resin composition of this invention is easily able to be shaped into molded articles, films or sheets by any of working processes for thermoplastic resins familiar to the skilled, such as injection molding and extrusion molding. The shaped products are extremely balanced in rigidity, heat resistance, impact resistance, scratch resistance, paintability, oil resistance, chemical resistance and water resistance, and have excellent appearance in uniformity and smoothness.

We claim:

1. A thermoplastic resin composition comprising 100 parts by weight of a resin composition (D) defined below and 2 to 30 parts by weight of copolymer (C) which contains epoxy groups and is a copolymer of
   (a) an unsaturated epoxy compound and ethylene; or
   (b) an unsaturated epoxy compound, ethylene and another ethylenically unsaturated compound other than ethylene, propylene or the unsaturated epoxy compound,
   wherein the unsaturated epoxy compound is at least one selected from the group consisting of glycidyl acrylate, glycidyl methacrylate, glycidyl itaconate, allyl glycidyl ether, 2-methylallyl glycidylether and p-styryl glycidyl ether,
   wherein the another ethylenically unsaturated compound is an olefin other than ethylene or propylene, a vinyl ester of saturated carboxylic acids having 2 to 6 carbon atoms, esters of saturated alcohol compounds having 1 to 5 carbon atoms with acrylic or methacrylic acid, maleates, fumarates, halogenated vinyl compounds, styrenes, nitriles, vinyl ethers and acrylamides;
   wherein said resin oomposition (D) is oomposed of 10 to 90 wt. % of polypropylene-resin (A) which is (i) a polypropylene graft-modified with 0.05 to 20 wt. % of unsaturated carboxylic acids or anhydrides thereof or (ii) a mixture of a polypropylene graft-modified with 0.05 to 20 wt. % of unsaturated carboxylic acids or anhydrides thereof and an unmodified polyproplene,
   and 90 to 10 wt. % of a polyamide resin (B).

2. A thermoplastic resin composition according to claim 1, wherein the polypropylene-resin (A) 20-80 wt. %, the polyamide resin (B) is 80-20 wt. %, and the copolymer (C) is 3-20 parts by wt.

3. A thermoplastic resin composition according to claim 1, wherein the polypropylene-resin (A) is 40-80 wt. % and the polyamide resin (B) is 60-20 wt. % and the copolymer (C) is 3-20 parts by wt.

4. A thermoplastic resin composition according to claim 1, wherein the unmodified polypropylene is a homopolypropylene or a crystalline copolymer of propylene and other α-olefins.

5. A thermoplastic resin composition according to claim 1 wherein the amount of carboxylic acid or anhydride thereof is 0.1-10 wt. %.

6. A thermoplastic resin composition according claim 1 wherein the polypropylene-resin (A) has a melt index of 0.1-100.

7. A thermoplastic resin composition according to claim 6 wherein the melt index is 0.5-40.

8. A thermoplastic resin composition according to claim 1, wherein the grafting monomer in the polypropylene-resin (A) is maleic anhydride.

9. A thermoplstic resin composition according to claim 1 wherein the grafted-copolymer of polypropylene is 5 wt. % or more on the basis of (A) when it is used with unmodified polypropylene.

10. A thermoplastic resin composition according to claim 1, wherein the polyamide resin (B) is an aliphatic or an aromatic polyamide or a mixture of copolymers thereof.

11. A thermoplastic resin composition according to claim 1, wherein the amount of unsaturated epoxy compound in the copolymer (C) is 0.1-50 wt. %.

12. A thermoplastic resin composition according to claim 11 wherein the amount of unsaturated epoxy compound in (C) is 1-30 wt. %.

13. A thermoplastic resin composition comprising 100 parts by weight of a resin composition (D) defined below and 2 to 30 parts by weight of copolymer (C) which contains epoxy groups and is a copolymer of
   (a) an unsaturated epoxy compound and ethylene; or
   (b) an unsaturated epoxy compound, ethylene and another ethylenically unsaturated compound other than ethylene, propylene or the unsaturated epoxy compound,
   wherein the unsaturated epoxy compound is at least one selected from the group consisting of glycidyl acrylate, glycidyl methacrylate, glycidyl itaconate, allyl glycidyl ether, 2-methylallyl glycidyl ether and p-styryl glycidyl ether,
   wherein the another ethylenically unsaturated compound is at least one selected from the group consisting of butene-1, vinyl acetate, methyl acrylate, diethyl acrylate, methyl ethacrylate, diethyl maleate, diethyl fumarate, vinyl chloride, vinylidene chloride, styrene, acrylonitrile, isobutyl vinyl ether and acrylamide;
   wherein said resin composition (D) is composed of 10 to 90 wt. % of polypropylene-resin (A) which is (i) a polypropylene graft-modified with 0.05 to 20 wt. % of unsaturated carboxylic acids or anhydrides thereof or (ii) a mixture of a polypropylene raft-modified with 0.05 to 20 wt. % of unsaturated carboxylic acids or anhydrides thereof and an unmodified polypropylene;
   and 90 to 10 wt % of a polyamide resin (B).

* * * * *